United States Patent Office 3,545,059
Patented Dec. 8, 1970

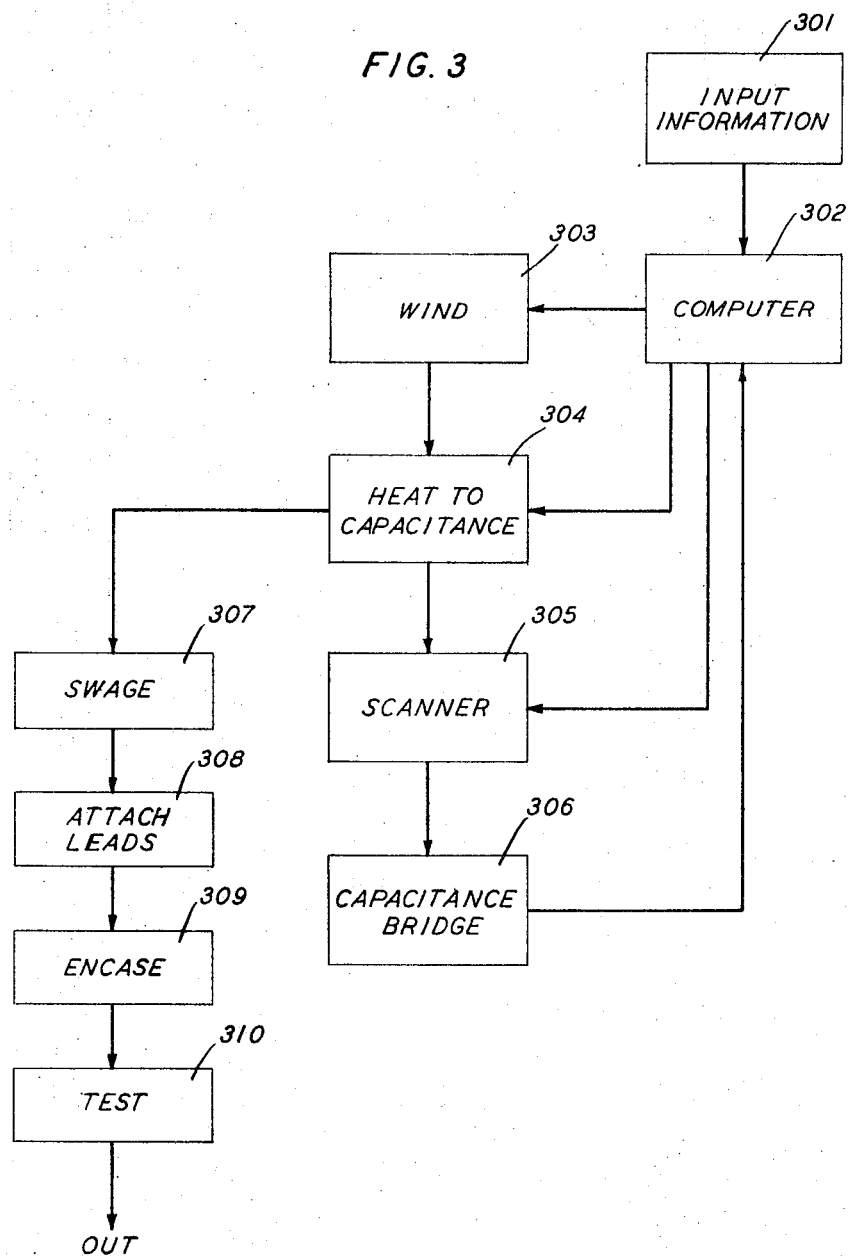

3,545,059
METHOD AND APPARATUS FOR MANUFACTURE OF CAPACITORS
Joel C. Masland, Whippany, and Joseph A. Toro, Berkeley Heights, N.J., assignors to Bell Telephone Laboratories, Incorporated, Murray Hill, N.J., a corporation of New York
Filed Aug. 22, 1967, Ser. No. 662,449
Int. Cl. H01g 3/26, 13/00; B23p 21/00
U.S. Cl. 29—25.42                      1 Claim

ABSTRACT OF THE DISCLOSURE

In the fabrication of plastic film capacitors, such as polystyrene capacitors, a plurality of capacitors is exposed to a heat source which is raised to and maintained at a preselected level. The capacitance of each individual capacitor is monitored substantially continuously during the heat treatment and a capacitor is removed from the heat source as soon as its capacitance reaches a desired value within a preselected tolerance.

BACKGROUND OF THE INVENTION

Field of the invention

This invention relates to methods and apparatus for the manufacture of capacitors and more particularly to heat treating methods and apparatus designed for the production of capacitors.

Description of the prior art

One of the byproducts of the accelerating expansion of virtually all forms of communication systems is a continuing demand for improved efficiency in the use of available frequency spectra. This demand is reflected in part by increased efforts to achieve closer design tolerances in the production of frequency determining circuit elements such as capacitors. Despite these efforts batch production of common high-volume types of capacitors, such as plastic film capacitors employing polystyrene for example, has been limited heretofore to capacitance tolerances of approximately ±2%. Even such tolerances typically require the application of precisely controlled heat treatments. In the many applications requiring capacitors of more exact capacitance magnitude, normal practice calls for selecting a pair of capacitors of the closest suitable magnitude and employing this selected pair in parallel to achieve the final capacitance desired. The only known alternative to this procedure is to test each capacitor in a finished batch, selecting only those very few that conform to the standard desired. Both of these procedures are obviously undesirable.

Accordingly, an object of the invention is to reduce the cost of mass producing high quality precision capacitors.

SUMMARY OF THE INVENTION

The stated object and related objects are achieved in accordance with the principles of the invention by applying a specifically programmed heat treatment simultaneously to a capacitor batch. Because the desired capacitance for any individual capacitor occurs only in a narrow time range, the individual unit variation in capacitance is monitored continuously at the heat treating temperature. Whenever the monitoring apparatus indicates that a particular capacitor has reached the desired capacitance within the allowed tolerance, which may be less than ±1%, the capacitor is ejected or otherwise removed from the heat treatment environment to a lower temperature environment for cooling.

With certain types and sizes of capacitors it is desirable in accordance with the invention to subject all of the units in a capacitor batch to a common preliminary heat treatment that brings the capacitance of the entire batch to some preselected capacitance range, which is above the desired capacitance. The entire batch, or portion of it, is then subjected to a second heat treatment in which the monitoring procedure described above is employed.

In accordance with one aspect of the invention the batch heat treating of capacitors to tolerance in combination with the described monitoring process is integrated into a fully automated, computer controlled capacitor production arrangement. The heat treatment area is loaded and unloaded in accordance with the capacitance level of each individual unit as determined by an electronic or other type of scanner in combination with a capacitance measuring device. Overall control is exercised by a computer which includes a memory unit that stores input information as to the capacitance level desired and the correction required.

BRIEF DESCRIPTION OF THE DRAWING

FIG. 3 is a functional block diagram of an automated computer controlled capacitor production arrangement in accordance with the invention.

DETAILED DESCRIPTION

Figure 1:
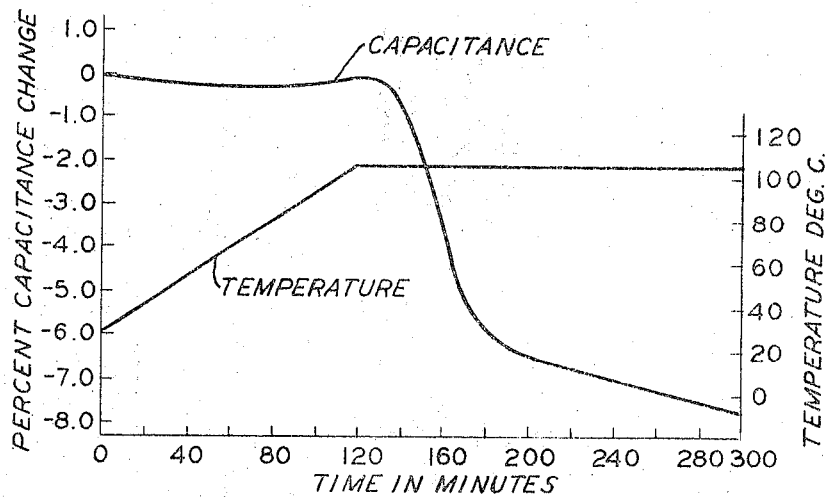
FIG. 1 is a plot showing the percent capacitance change of a typical individual polystyrene capacitor as a function of a programmed heat treatment in accordance with the invention.

The plot shown in FIG. 1 illustrates a typical heat cycle which can be employed in accordance with the principles of the invention to change the capacitance of a polystyrene capacitor. As indicated, the temperature is increased from ambient to a heat treating temperature of approximately 102° C. Little change in capacitance occurs in the capacitor being processed until the heat treating temperature is reached, at which point it begins to decrease abruptly. The relatively rapid change in value continues for a period of approximately one hour. After this time interval the capacitance value continues to decrease but the rate of change is substantially lower.

Figure 2:
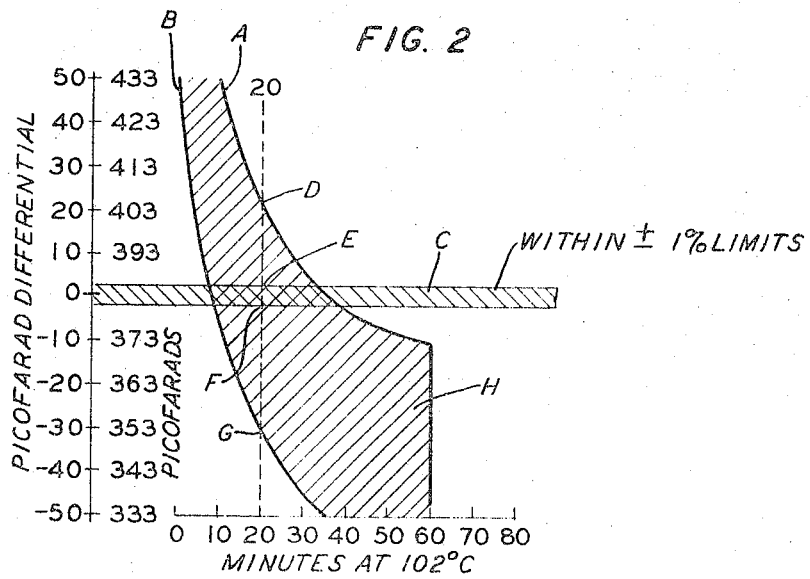
FIG. 2 is a plot of a typical range of capacitance change that occurs as a function of the duration of the application of heat at a given temperature.

Irrespective of how carefully capacitors are manufactured, each individual capacitor of a given batch changes in value at a slightly different rate when heated, even if the initial capacitance values of all the units in the batch are identical. This effect is illustrated in FIG. 2. Curves A and B mark the limits of capacitance change for a particular batch of polystyrene capacitors. Accordingly, the area H is made up, in effect, of a whole family of curves each indicating the capacitance behavior of a corresponding capacitor in the batch. As indicated above, prior art manufacturing procedures call for heating all of the capacitors in a batch for some preselected period of time, such as 20 minutes for example, at a given temperature such as 102° C., as shown in FIG. 2. All of the capacitors are then withdrawn from the heating apparatus. An inspection of FIG. 2 shows that after 20 minutes of heat treating the capacitance varies rather widely along the line 20—20. Only those capacitors falling within the points E and F come within the desired tolerance of ±1% of the design value of 383 picofarads, the tolerance range being indicated by the area strip C. Capacitors falling between the limits D–E and F–G are obviously outside of the desired tolerance range. As a result, the yield of the capacitor batch, or the percentage of units meeting the desired tolerance standard, is on the order of only 20%. Such yields are economically impractical.

In accordance with the invention, capacitor yields within the tolerance indicated may be increased to substantially 100%. The principles of the invention call for continuously monitoring the capacitance of each individual unit in a batch while it is exposed to heat at the elevated level. As each capacitor reaches the desired capacitance value, it is individually ejected from the heating area. The heat treatment termination points of all of the capacitors are thus limited to that area which is common to areas C and H.

An illustrative automated system for producing capacitors in accordance with the principles of the invention is shown in the form of a simplified functional block diagram in FIG. 3. The details of implementing such a system are well within the state of the art and accordingly have been omitted to ensure brevity and clarity in the disclosure of the various features of the invention.

The input information block 301 supplies the computer 302 with all of the initial control data for processing a particular capacitor batch. This information includes the capacitance or capacitance range desired for the capacitors prior to the heat treatment, the physical location of each capacitor in the oven or other heating apparatus 304, the final capacitance desired after heat treatment and the permissible range of tolerance. The computer 302 in turn controls the initial fabrication process by suitable signals to the wind block 303 which serves to regulate the winding of the capacitors to ensure an initial capacitance which is suitable for heat treating to the final capacitance desired.

After the winding process, capacitors are directed automatically to the heat-to-capacitance unit or heater 304. The heater may be of any suitable conventional form, preferably including an individual identifiable slot or position for each capacitor. The memory of the computer 302 stores information in code form indicating the heat treatment time for each capacitor and the periodically measured capacitance of each unit. The capacitance monitoring process is carried out by the scanner 305 in combination with a conventional capacitance bridge 306. Any one of a number of scanning arrangements such as an electronic scanner, for example, may be employed so long as it effects a connection between each individual capacitor and the capacitance bridge 306 at intervals that should preferably not exceed 30 seconds.

Whenever a measured capacitance transmitted to the computer 302 matches the desired temperature-corrected end capacitance within the range of tolerance, an eject signal is transmitted from the computer to the heat-to-capacitance unit 304 which serves to initiate the operation of mechanical handling apparatus (not shown), removing the particular capacitor from the unit 304. For a continuous processing arrangement in accordance with the invention, similar mechanical handling apparatus may be employed to lead an additional capacitor into the unit 304 immediately after the removal or unloading of any capacitor upon the termination of its heat treatment. Such apparatus would also be controlled by the computer 302.

After the heat-to-capacitance process, each capacitor is conveyed through the conventional final processing steps indicated by the swage block 307, the attach-leads block 308, the encase block 309 and the test block 310.

To facilitate mass producing capacitors in accordance with the invention it is evident that an automated arrangement of the type illustarted in FIG. 3 is desirable. The heat-to-capacitance concept of the invention, however, is not limited to a process employing fully automatic controls but may instead be employed in the processing of a very limited number of capacitors or of a single capacitor in which many or all of the automatic features may be eliminated.

It is to be understood that the embodiment shown herein is merely illustrative of the features of the invention. Various modifications may be effected by persons skilled in the art without departing from the spirit or scope of the invention.

What is claimed is:

1. A method for batch producing polystyrene capacitors consisting of the steps of:
   (a) exposing a batch of capacitors to increasing temperature until a preselected temperature above ambient is attained,
   (b) maintaining said batch at said preselected temperature for a preselected period of time,
   (c) gradually reducing the temperature of said capacitors to ambient level,
   (d) sorting said capacitors into groups of substantially like capacitance,
   (e) raising the temperature level of each of said groups independently and abruptly to said preselected level,
   (f) monitoring the capacitance of each of said capacitors within said groups substantially continuously while maintaining said last named preselected temperature level,
   (g) reducing the temperature of each of said capacitors individually to ambient level by ejecting each of said capacitors from the heating environment as each attains a preselected magnitude of capacitance within a preselected tolerance as determined by said monitoring.

References Cited

UNITED STATES PATENTS

| 1,789,451 | 1/1931 | Rosaire | 29—25.42X |
| 2,016,455 | 10/1935 | Purdy | 29—25.41X |
| 2,596,396 | 5/1952 | Foust | 29—25.41X |
| 2,842,652 | 7/1958 | Clemons | 29—25.41 |
| 2,842,653 | 7/1958 | Clemons | 29—25.41 |
| 3,278,130 | 10/1966 | Jannett | 29—25.41X |
| 3,346,933 | 10/1967 | Lindsay | 29—25.41 |
| 3,378,767 | 4/1968 | Moore | 29—25.41X |
| 3,296,684 | 1/1967 | Allen | 29—498X |

FOREIGN PATENTS

| 1,002,143 | 8/1965 | Great Britain | 29—25.41 |

WAYNE A. MORSE, JR., Primary Examiner

U.S. Cl. X.R.

29—497, 498